United States Patent
Mueller et al.

(10) Patent No.: US 10,270,647 B2
(45) Date of Patent: Apr. 23, 2019

(54) COMPUTER SYSTEM AND METHOD FOR MESSAGE ROUTING

(71) Applicant: Urban Software Institute GmbH, Chemnitz (DE)

(72) Inventors: Christian Mueller, Wiesbaden (DE); Daniel Muench, Michelstadt (DE)

(73) Assignee: Urban Software Institute GmbH, Chemnitz (DE)

( * ) Notice: Subject to any disclaimer, the term of this patent is extended or adjusted under 35 U.S.C. 154(b) by 398 days.

(21) Appl. No.: 15/130,599

(22) Filed: Apr. 15, 2016

(65) Prior Publication Data
US 2016/0308714 A1    Oct. 20, 2016

(30) Foreign Application Priority Data
Apr. 18, 2015    (EP) .................................... 15164156

(51) Int. Cl.
*H04L 12/24* (2006.01)
*H04L 29/08* (2006.01)
(Continued)

(52) U.S. Cl.
CPC .......... *H04L 41/0803* (2013.01); *G06F 9/546* (2013.01); *G06F 17/30292* (2013.01);
(Continued)

(58) Field of Classification Search
CPC ... H04L 41/0803; H04L 63/101; H04L 63/20; H04L 67/1002; H04L 67/04; G06F 9/50; G06F 17/30292
See application file for complete search history.

(56) References Cited

U.S. PATENT DOCUMENTS 8,712,628 B1 * 4/2014 Hart ...................... G06Q 10/10 701/1
8,819,026 B2 * 8/2014 Fischer .................. G06Q 10/06 707/742
(Continued)

FOREIGN PATENT DOCUMENTS

EP        2736002 A1    5/2014
KR   10-2013-0033708 A    4/2013
(Continued)

OTHER PUBLICATIONS

European Search Report received for EP Patent Application No. 15164156.0, dated Oct. 22, 2015, 3 pages.
(Continued)

*Primary Examiner* — Blake J Rubin
(74) *Attorney, Agent, or Firm* — Brake Hughes Bellermann LLP

(57) ABSTRACT

Message routing techniques include use of at least one controller module configured to maintain a graph. The graph defines communication relations between a plurality of message communication modules. Each communication relation defines a particular message type for a particular pair of modules. The plurality of message communication modules includes a first module configured to receive a message wherein the received message has a message type and is associated with least one pre-condition. Upon verification of an acceptance condition of the at least one pre-condition the received message is accepted if the acceptance condition is fulfilled. Upon verification of a generating condition of the at least one pre-condition, the first module generates a generated message directed to at least a second module or an external data consumer in accordance with the graph if the generating condition is fulfilled.

20 Claims, 7 Drawing Sheets

(51) Int. Cl.
*G06F 17/30* (2006.01)
*H04L 29/06* (2006.01)
*G06F 9/54* (2006.01)

(52) U.S. Cl.
CPC ............ *H04L 63/101* (2013.01); *H04L 63/20* (2013.01); *H04L 67/1002* (2013.01); *H04L 63/04* (2013.01)

(56) References Cited

U.S. PATENT DOCUMENTS

| | | |
|---|---|---|
| 2008/0168173 A1 | 7/2008 | Munje et al. |
| 2011/0055426 A1 | 3/2011 | Lakshmanan et al. |
| 2011/0125921 A1* | 5/2011 | Karenos .................. H04L 45/00 709/240 |
| 2011/0270453 A1 | 11/2011 | Kalogridis et al. |
| 2011/0282508 A1* | 11/2011 | Goutard .................... H02J 3/06 700/293 |
| 2012/0082048 A1* | 4/2012 | Taft ..................... H04L 12/1836 370/252 |
| 2012/0089494 A1* | 4/2012 | Danezis ............... G06Q 20/102 705/34 |
| 2012/0190386 A1* | 7/2012 | Anderson .............. G01C 15/04 455/456.3 |
| 2012/0224057 A1* | 9/2012 | Gill ......................... G06F 21/55 348/143 |
| 2012/0258680 A1 | 10/2012 | Piett et al. |
| 2012/0284790 A1* | 11/2012 | Bhargava ............ G06F 11/3612 726/22 |
| 2013/0191185 A1 | 7/2013 | Galvin |
| 2013/0227707 A1* | 8/2013 | Gay .................... H04L 63/0421 726/27 |
| 2013/0274955 A1* | 10/2013 | Rosenbaum ........... G06F 17/00 701/1 |
| 2014/0189888 A1* | 7/2014 | Madhok .............. H04L 63/0807 726/29 |
| 2014/0277788 A1* | 9/2014 | Forbes, Jr. ................ G05F 1/66 700/286 |
| 2015/0089061 A1* | 3/2015 | Li .......................... H04W 4/70 709/226 |
| 2016/0063191 A1* | 3/2016 | Vesto .................... G06F 19/324 705/2 |
| 2016/0104200 A1* | 4/2016 | Osotio ............... G06Q 30/0267 705/14.64 |
| 2016/0148267 A1* | 5/2016 | Pittman ................. H04W 4/029 705/14.53 |
| 2016/0171521 A1* | 6/2016 | Ramirez ............. G06Q 30/0224 701/409 |
| 2016/0248746 A1* | 8/2016 | James ..................... H04W 4/70 |
| 2017/0032673 A1* | 2/2017 | Scofield ................ G08G 1/0112 |
| 2017/0208151 A1* | 7/2017 | Gil ......................... H04L 67/34 |
| 2017/0317984 A1* | 11/2017 | Ollikainen .......... G06F 21/6254 |

FOREIGN PATENT DOCUMENTS

| | | |
|---|---|---|
| WO | 2012/149981 A1 | 11/2012 |
| WO | 2014/043348 A2 | 3/2014 |

OTHER PUBLICATIONS

Communication pursuant to Article 94(3) received for EP Patent Application No. 15164156.0, dated Nov. 6, 2015, 7 pages.

* cited by examiner

COMPUTER SYSTEM AND METHOD FOR MESSAGE ROUTING

CROSS REFERENCE TO RELATED APPLICATIONS

This application claims priority to European Patent Application No. EP15164156, filed Apr. 18, 2015, titled "COMPUTER SYSTEM AND METHOD FOR MESSAGE ROUTING" which is incorporated herein by reference in its entirety.

TECHNICAL FIELD

The present description generally relates to electronic data processing, and more particularly, relates to methods, computer program products and systems for keeping control of data.

BACKGROUND

A general problem in networked computer systems is to keep control of data in such a way that the creator or owner of such data can determine who may use the data for which purpose. Security solutions for complex event processing systems provide confidentiality of data, authorization of network participants as well as encryption of event data. In particular, public key infrastructures are applied to complex event processing (CEP) systems using a publish/subscribe architecture in order to provide confidentiality of data, authorization of network participants as well as encryption of event data.

In some existing CEP systems, a problem arises when data being used is gathered from large quantities of external entities and people with no relationship to the organization using the data. For example, in upcoming initiatives such as Smart Cities, large quantities of data are gathered from various sources such as public infrastructures and private data (e.g., households' energy and water consumption, location data, or shopping behavior). The scale of such systems makes it very hard to implement a scheme where citizens and other third parties can explicitly determine how their private data being gathered from their homes is to be utilized, and prevent the misuse and access from unintended entities.

SUMMARY

The present description describes an approach providing more flexibility to define scalable control mechanisms for data when flowing from data sources to data sinks so that misuse and access from unintended entities can be prevented but specific aggregate use of data by third parties can be allowed under specific circumstances.

Data owners are given the ability to specify the data granularity (frequency, precision, resolution) and to specify if their data shall be correlated with other sources of information. Further, data owners are given the possibility of specifying whether their data shall be used in unforeseen or exceptional cases or under specific conditions.

User specific data can be useful to optimize a technical process such as the control of energy provisioning of households or the control of technical equipment used for traffic management. A problem is that such data typically is tied to an individual or a group of individuals (e.g., one or more persons in a household or in a car). Therefore, the individual person (user) may be interested in protecting privacy of his or her data whereas the user may be prepared to allow use of the data by other parties under certain conditions. Therefore, there is a technical problem to provide a system which allows an individual user to keep control over data provided to computer systems or computer networks whereby the system or network is scalable with regards to the number of users and the amount of data provided the users.

The problem is solved by a computer system which receives data from one or more data sources through one or more inbound interface modules. The received data can be analyzed by one or more complex event processing modules to detect whether a predefined event condition is fulfilled by the received data. One or more controller modules manage communication relationships between the modules. The communication is based on message exchange. The controller module(s) know(s) the load of each module instance and can therefore balance the load of each module by checking whether an existing module instance would exceed its processing capacity by processing a new event type.

Data received by the interface inbound module can result in a message related to a specific data set or to aggregates of multiple data sets in a single message. The one or more controller modules are configured to control whether such a message is allowed to be generated at all in the system by checking predefined pre-conditions which define under which circumstances such a message creation with the data provider's constraints (e.g., data privacy constraints) is allowed. Such a pre-condition may include at least one static rule or event that must have occurred before the corresponding message can be generated. The controller module registers queries for checking corresponding pre-conditions with the complex event processing module. If such a pre-condition is detected and forwarded by the inbound interface module to the complex event processing module. The complex event processing module can notify the controller module if the received message corresponds to a pre-condition. The controller module in response can then update the configuration of the other modules accordingly.

In other words the controller module can add new communication relations to the system configuration at runtime and notify all affected modules accordingly. Similarly, the controller module can remove communication relations from the system communication if they are not needed any more and even shut down a module instance to avoid allocating more system resources than are actually needed.

The configuration of communication relations can be defined by a graph stored in a graph database such as ORIENTDB (available from Orient Technologies LTD, London, United Kingdom) or by any other database type supporting the storage of Subject, Predicate and Object (e.g., through three column representations) related configuration data. Even a simple file (text or binary data) can store the communication relations. The communication relations define that a pre-condition check occurs for each message to be exchanged between any one of the modules of the system.

The described system architecture allows an individual user to keep control over data provided to the system by determining the respective use of constraints as defined by the pre-conditions. For example, a user may not allow a metering operator in an energy provisioning network to forward any information regarding the individual energy consumption of his or her household to the energy network operator unless the network gets into an instable condition. In such an event the user can consent that, for example, his or her data is used by the network operator either on a household basis or perhaps only at an aggregate level aggregating all data of the households in a particular quartier. That is, the user keeps control of the data provided to the metering operator and determines under which conditions which data may be used by third parties at which aggregation level.

In general, the computer system for message routing according to example embodiments can be described as pairs of communication modules which are cascaded or arranged in parallel. The system has at least one controller module configured to maintain a communication relations graph. The graph defines communication relations between a plurality of message communication modules. Each communication relation defines a particular message type for a particular pair of modules out of the plurality. In general, such a pair of communication modules includes a first and a second communication module. The terms message communication module, communication module and module are used as synonyms hereinafter. The controller module thereby is not a communication module in this sense but is enabling the communication between such modules.

The first module is configured to receive a message wherein the received message has a message type and is associated with least one pre-condition. Upon verification of an acceptance condition of the at least one pre-condition in accordance with the graph the received message is accepted if the acceptance condition is fulfilled. Further, upon verification of a generating condition of the at least one pre-condition in accordance with the graph, the first module generates a generated message directed to at least a second module or an external data consumer in accordance with the graph (300) if the generating condition is fulfilled. The generated message can be identical to the received message in which case the generated message corresponds to a forwarding of the received message. The generated message may also be a new message (e.g., aggregated message) which is composed by using the data of the received message together with further data of further received messages and computing a result (e.g., average data, sum of data, etc.)

The at least second module also implements the function of the first module with regards to received messages. That is, when the second module receives the generated message as the target module of the first module (in accordance with the graph), the second module treats the generated message as received message and performs the same check and message generating steps as the first module. At least a further module is treated like the original at least second module in accordance with the graph. That is, the at least second module uses the at least further module (or the external data consumer) as the target for the message which is now generated by the second module.

The message routing system can be iteratively expanded by adding such pairs of modules and establishing the respective communication relations in the graph. For example, the pairs of modules having a communication relation can include the first module being an inbound interface module and the second module being a complex event processing module, a persistence module, or an analytics module. Further, the second module can be an outbound interface module and the first module can be a complex event processing module, a persistence module, or an analytics module. It is also possible, that the first and second modules are the same. That is, the module is sending a message to itself. This may be the case with complex event processing modules or analytics modules in which case a multi stage processing of data messages by the same module is enabled.

In order to enable a message flow from data sources to data consumers at least one message communication module is configured to receive a message from an external data source, at least one message communication module is configured to process the received message by using complex event processing, and at least one message communication module is configured to forward the generated message to the external data consumer.

In one embodiment at least one message communication module is configured to persist (store) the received message. In this embodiment, the computer system can allow data consumers to query historic data which were persisted based on earlier received messages.

In one embodiment, the at least one controller module may be further configured to register one or more queries with at least one of the message communication modules for detecting a particular event associated with a particular pre-condition, the particular pre-condition being associated with a particular pair of communication modules. For example, CEP modules can be used such event detection tasks. The controller module may then receive a notification from the at least one of the message communication modules when the particular event is detected and can activate a particular communication relation between the particular pair of message communication modules when the particular pre-condition is fulfilled. When the particular pre-condition ceases to be fulfilled the at least one controller module can deactivate the particular communication relation between the particular pair of message communication modules again. This allows the controller module to create and terminate communication relations between modules on the fly to dynamically react to certain events which are relevant to pre-conditions as defined by users of the data sources. A flexible and granular handling of data privacy constraints in relation to individual data is therefore enabled by example embodiments.

In one embodiment, the at least one controller module can receive a module identifier from a communication module being started for the first time. The controller can then create a module representation for the first time started communication module in the communication relations graph and send controller module configuration data to the first time started communication module. The first time started module is then aware of the controller module by which it is managed. The controller module can further generate communication relations for the first time started communication module according to predefined load metrics and switch communication relations in the graph from a previously existing communication module to the first time started communication module for balancing the load based on the load metrics in case of a re-scaling event. In this embodiment, the scalability of the message routing system is improved by adding additional communication modules duplication the function of already existing modules on the fly which can then handle parts of the message flow if the load for the previously existing modules becomes too high according to the load metrics. The predefined load metrics can include the number of communication relations of one or more communication modules of the same kind, the frequency of sent or received messages, the physical resources of a communication module, the response time of a communication module, the latency between different communication modules, and/or a failure of a module. Switching communication relations may include cloning affected outbound interface communication relations of the previously existing communication module for the first time started communication module, switching affected inbound interface communication relations from the previously existing communication module for the first time started communication module, and removing affected outbound interface communication relations of the previously existing communication module.

The described functions and method steps of the message routing system can be performed by the respective modules of the system when the system is executing a corresponding computer program product which includes a set of computer readable instructions stored in a memory of the system and executed by at least one processor of the system.

Further aspects will be realized and attained by means of the elements and combinations particularly depicted in the appended claims. It is to be understood that both, the foregoing general description and the following detailed description are exemplary and explanatory only and are not restrictive.

DETAILED DESCRIPTION

Topics like Smart City, District Energy Management, Smart Home and Intelligent Traffic Management are increasingly making use of management and real time analytics of large amounts of data created by an increasing number of sensors. This leads to problems regarding the real time capability of systems in view of the large amount of data and regarding the privacy of personal data belonging to individuals.

For example, due to a more and more distributed and volatile energy production, the management of the energy grid will need more information about the energy needs of individuals to ensure and keep grid stability. Traffic management will also require more information of the acting individuals to improve the whole system. Typically, this comes at the price of penetrating the personal privacy of individuals. In certain situations and under certain conditions, individuals may be willing to provide personal data to third parties to gain benefits. For example, an individual may achieve an added value for himself (e.g., optimization of one's own system, reduction of one's own cost, immediate assistance in case of emergency situations, etc.) or the individual may contribute to raise a common benefit (e.g., improved handling of emergency situations, improving and stabilizing the public infrastructure like electricity grids and traffic roads, etc.). The following scenarios disclosed in this document provide examples for the use of various embodiments.

Figure 1:
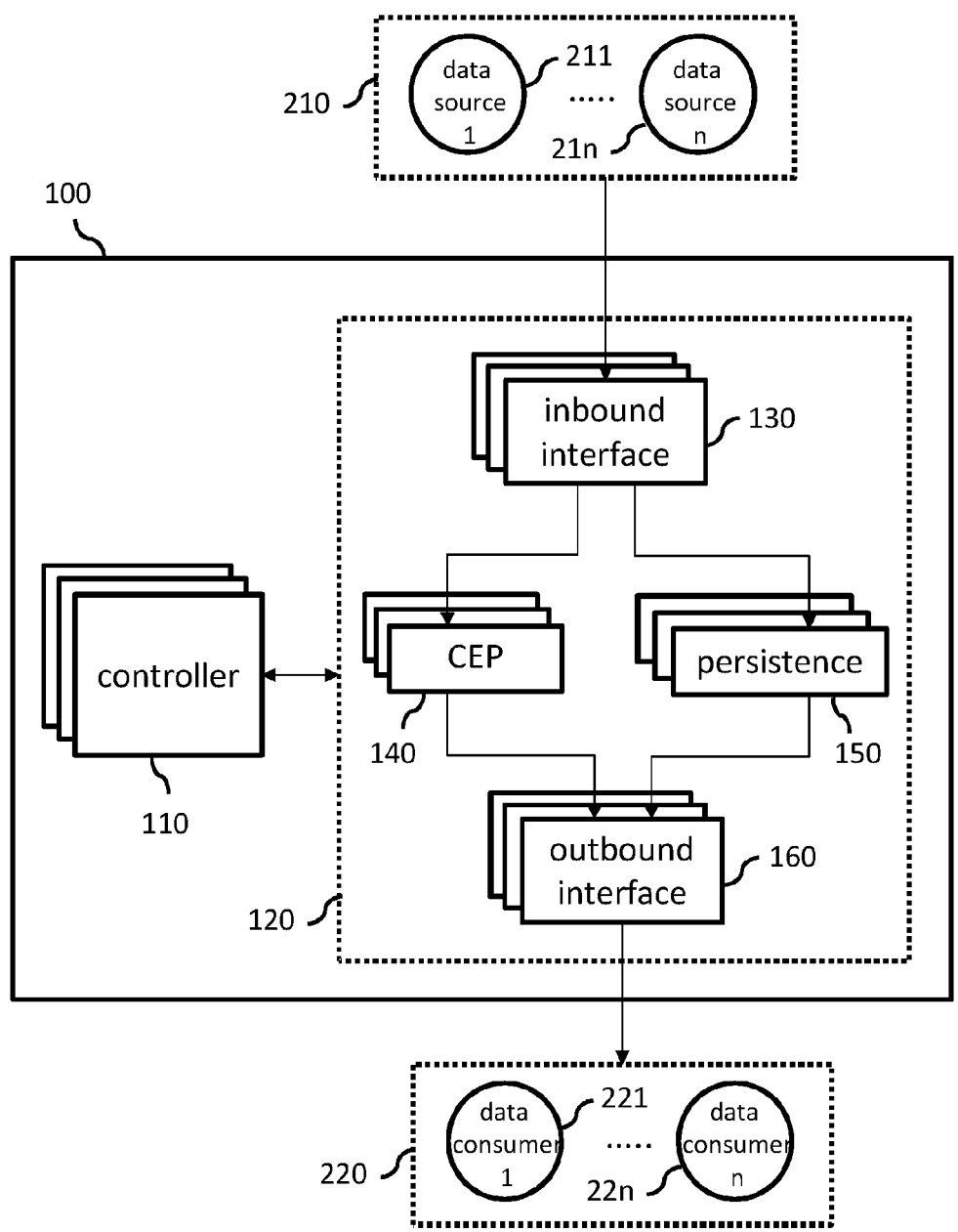
FIG. 1 is a simplified block diagram of a computer system for message routing according to an embodiment.

FIG. 1 is a simplified block diagram of a computer system 100 for message routing according to an example embodiment. Further, reference will be made to FIG. 2 showing a simplified graph 300 which illustrates communication relations between communication modules of the computer system 100.

In the example of FIG. 1 the computer system 100 has one or more controller modules 110, one or more inbound interface modules 130, one or more complex event processing (CEP) modules 140, one or more persistence modules 150, and one or more outbound interface modules 160. Communication relations between pairs of modules are defined by the graph 300 (cf. FIG. 2) which is maintained by the one or more controller modules 110. The graph 300 has representations 330, 340, 350, 360 of the respective modules 130, 140, 150, 160. The computer system can also include further modules (e.g., an analytics module) at the same level as the CEP and persistence modules 140, 150. That is, further data processing modules may be plugged in between the inbound and outbound interface modules 130, 160. The following example pairs of modules can have a communication relation: an inbound interface module 130, 330 and a complex event processing module 140, 340; an inbound interface module 130, 330 and a persistence module 150, 350; a complex event processing module 140, 340 and an outbound interface module 160, 360; and a persistence module 150, 350 and an outbound interface module 160, 360. Thereby, the one or more inbound interface modules 130, 330 are configured to receive messages from the external data sources 210, 310. The one or more CEP modules 140, 340 are configured to process the received messages by using complex event processing. CEP modules allow the detection, filtering, aggregation and creation of events. The CEP module(s) can be realised with existing off the shelf Complex Event Processing Engines like ESPER (available from EsperTech Inc., Wayne, N.J. USA) or APAMA (available from Software AG, Darmstadt, Germany) and additional interfaces that realize the communication with the controller module(s). Main functions are the registration of new message/event types, the registration of new queries to select specific events, event aggregations and complex events.

The one or more persistence modules 150, 350 are configured to persist (store) the received messages in respective memory portions of the computer system and can provide access to historic data/events. The one or more outbound interface modules 160, 360 are configured to forward generated messages to external data consumers 220, 320.

Figure 2:
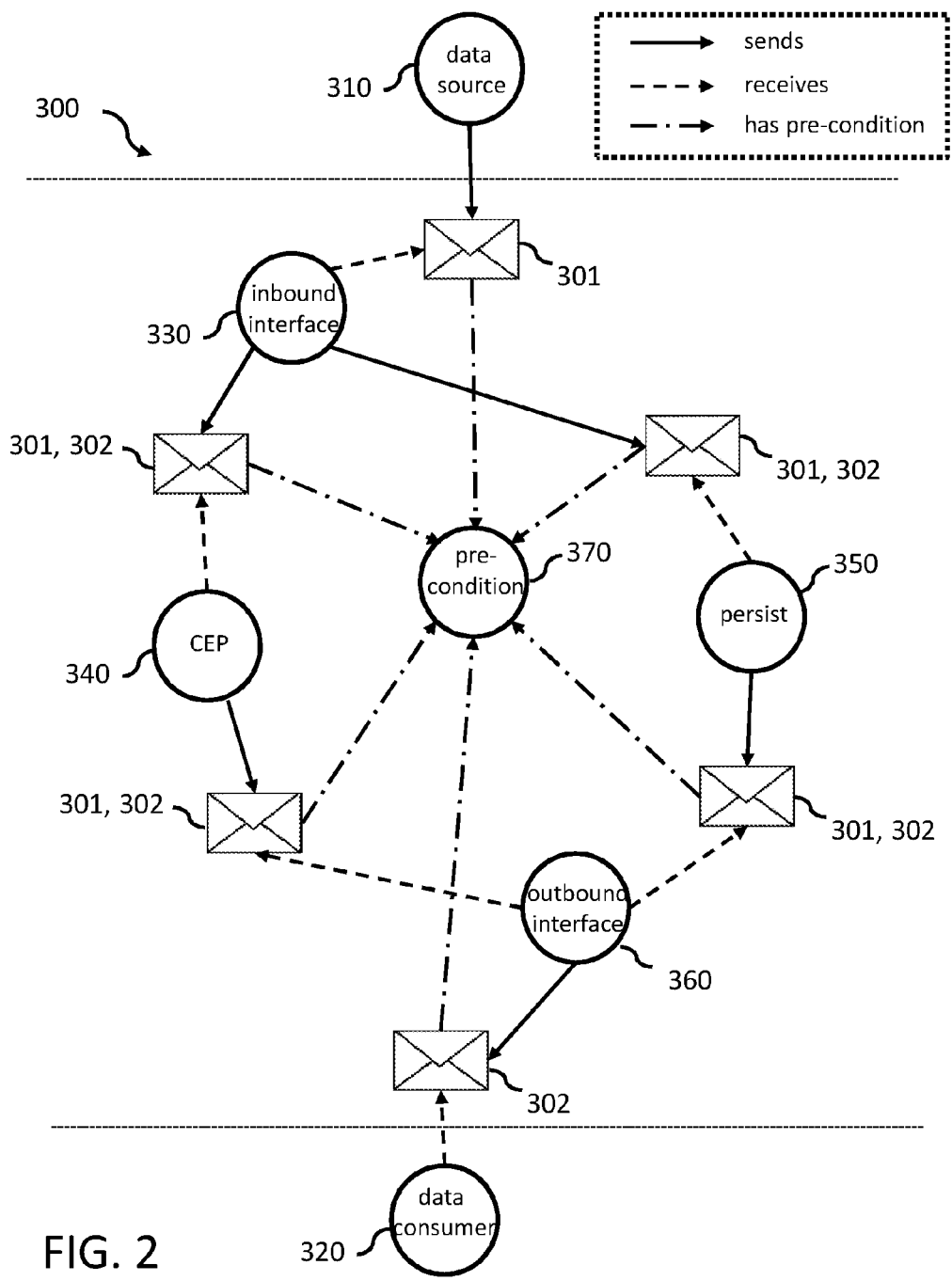
FIG. 2 is a simplified graph which illustrates communication relations between communication modules of the computer system.
Figure 3:
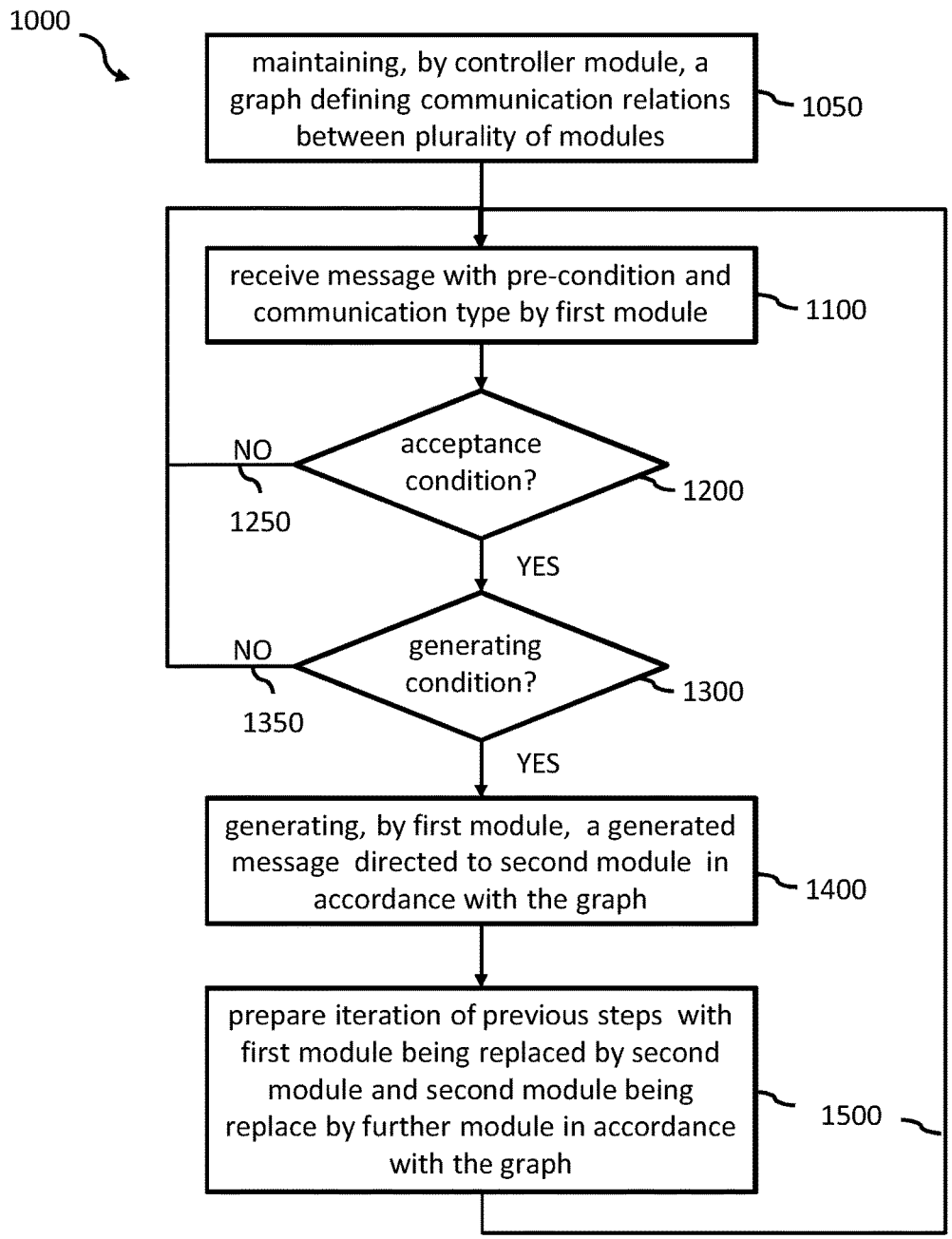
FIG. 3 is a simplified flow chart of a computer-implemented method for message routing being executed by the computer system when running a corresponding computer program product according to one embodiment.

Turning briefly to FIG. 2, the graph 300 illustrates possible communication relations between the various communication modules. Each communication module can be configured to receive messages 301 (dashed arrows) and to generate messages 302 and send (straight line arrows) it to a further communication module. Each module can accept a received message 301 or ignore it dependent on a pre-condition 370 associated (dashed-dotted arrows) with the received message 301. FIG. 3 is simplified in that only one pre-condition 370 is shown. However, for each module and for each accept or generate message decision a different pre-condition can exist. The person skilled in the art will understand pre-condition 370 as a general representation of any potential pre-condition relevant at the respective communication module for taking an accept or generate decision. If the corresponding pre-condition is fulfilled the respective communication module accepts/generates the received/generated message 301/302, respectively. A generated message can correspond to a forwarding of the received message but it can also result in the creation of a new message. Thereby, each communication module can receive the information necessary to take such decisions from the controller module. In other words, the controller module can share the knowledge about the communication relations graph 300 with the other communication modules to the extent that they are in possession of all necessary information for taking the correct message routing decisions. Communication relations can be static or dynamic. That is, a communication relation may always exist or it may be activated at runtime during the operation of the computer system dependent when suddenly a certain pre-condition is fulfilled and it may be deactivated again when the pre-condition is not fulfilled anymore.

The embodiment of FIG. 1 is now described by using an example application scenario based on energy management of energy grids. Given, there are three households A, B and C, wherein each household is equipped with smart meter technology. A smart meter is usually an electronic device that records consumption of electric energy in intervals of an hour or less and communicates that information at appropriate time intervals back to the utility for monitoring and billing. Smart meters enable two-way communication between the meter and a central system. Smart meters typically can gather data for remote reporting (data to the energy provider). Such an advanced metering infrastructure enables two-way communications with the meter.

The meter operators (utility) receive data about the energy consumption of the households for the purpose of billing. An energy provider may be interested in detailed energy consumption data of each individual household or even of individuals within the household. In this example, the energy provider provides data about the grid as data sources 210 to the computer system 100. Further, the energy provider may request from the consumers (e.g., households A, B and C) to become data sources 210 (e.g. A becomes data source 211, etc.) for the computer system 100 and to agree to the further use of their energy data collected by the respective smart meters by specifying to which extent the data can be used or consumed.

Besides A, B and C further data sources may exist either in the form of other smart meters or in the form of further sensors which may provide to the computer system status information about the status of the energy grid. Such further sensors may be operated by data consuming entities (e.g., the energy provider itself) and the provided data may therefore not be associated with constraints or pre-conditions at all.

In the example scenario, household A 211 agrees. Household B 21n agrees with the restriction, to only make use of its data if the whole energy grid is about to fail (i.e. the energy grid is in a critical unstable condition). In addition, B prohibits that its data will be stored permanently. Household C (not shown) agrees with the restriction, to only make use of its data as an aggregate of the data sets of the other households.

As a consequence of the household preferences and restrictions respective pre-conditions are configured by using one or more controller modules or the 110 of the system. In the following scenario a single controller module 110 is assumed. However, multiple controller modules may be used parallel for load balancing purposes. This will be explained later. The pre-conditions 370 may be configured by the households A, B, C or by the energy provider under the control of the consumers using appropriate user interface means. For example, the computer system 100 may provide a web service which allows the consumer(s) or energy provider(s) to remotely access the controller module 110 and to support the creation of the respective pre-conditions 370 accordingly. According to the above example scenario the following pre-conditions are configured in the one or more controller modules 110.

A mentioned no restrictions. Therefore no pre-condition needs to be defined for data source 211. As a consequence, the controller module 110 has the configuration definition:
if data source="A" AND message type="data message":
 allow all communication relations.

B mentioned the risk of grid failure and prohibits the storage of its data. Therefore the corresponding pre-conditions can be defined as:
1) if data source="B" AND message type="data message":
 if an event or forecast value is indicating a critical state of the grid (e.g., the delta of total energy production and total energy consumption is getting close to zero)), then allow all communication relations; (In general, the critical state can be determined based on one or more of technical parameters indicating a technical situation in that the energy supply system of the energy provider faces a critical situation (e.g. total consumption approaching a percentage threshold of the capacity, etc.)
2) if data source="B" AND message type="data message":
 persistence not allowed.

C mentioned, that it only agrees to the use of its data if its data is aggregated with data from other households. Therefore the precondition can be defined as:
if data source="C" AND message type="data message":
 aggregation only.

Upon the configuration of the pre-conditions, the controller module 110 can create and/or maintain the graph 300 which defines communication relations between a plurality 120 of message communication modules 130, 140, 150, 160 of the computer system 100. Each communication relation defines a particular message type (e.g., data message, status message, etc.) for a particular pair of modules out of the plurality 120. The graph 300 can be stored in any appropriate data structure format in a memory portion of the computer system 100. A graph data structure includes a finite (and possibly mutable) set of nodes or vertices, together with a set of ordered pairs of these nodes (or, in some cases, a set of unordered pairs). These pairs are known as edges or arcs. An edge (x,y) is said to point from x to y. A graph data structure may also associate to each edge an edge value, such as a symbolic label or a numeric attribute (e.g., the predicate of the relation). In the context of the communication relation graph data structure the edges in the graph represent the predicates (e.g., sends, receives, etc.) of the respective relations.

In the example scenario, the following communication relations can be created in the graph 300. There are relations between the inbound interface module 130, 330 and each household (data sources 210, 310). Further, there are relations between the inbound interface module 130, 330 and the persistence module 150, 350 for messages received from A and C. B has an explicit pre-condition 2) preventing any persistence of its data. Therefore, no corresponding communication relation with the persistence module is created for B.

Due to the pre-condition 1) of B, the controller module 110 creates two communication relations in the graph 300: a first communication relation between the inbound interface module 130 and the CEP module 140, and a second one between the CEP Module 140 and itself. In addition, the controller module 110 registers one or more queries in the CEP Module 140 to receive notifications if the pre-condition 1) of household B is fulfilled by a message or not. The registration of queries is disclosed in more detail in FIG. 6. The CEP may also receive messages/events from other data sources than consumer related smart meters. For example, the energy grid provider can continuously send data which indicate whether the grid is approaching a critical status. The CEP module can then evaluate such events to detect the critical state based on predefined corresponding queries.

For example, the energy provider (data consumer) wants to make use of the provided data and configures the controller module 110 to send a notification if one of the households exceeds its average energy consumption by 10%. The controller module 110 can check the respective pre-conditions and perform the following actions:

It rejects the request of the energy provider for household C since the query is not related to aggregate data of multiple households (as allowed by the pre-condition of C).

It establishes the communication relations between the inbound interface 130, 330 and CEP Module 140, 340 for messages of A and B.

It creates relations between the CEP Module 140, 340 and the outbound interface module 160, 360 for such notification messages which are associated to the messages and pre-conditions of the households A and B.

In operation, the smart meters (data sources 210, 310) of A, B and C send energy consumption data having a message type "data message" which are received 1100 by the inbound interfaces 130, 330. Further, the energy provider sends data about the grid state (i.e. the technical status if grid) to the inbound interfaces 130, 330. The inbound interface module 130, 330 checks 1200 if any configured pre-condition 370 includes an acceptance condition which would not be fulfilled by any of the received messages 301. As no pre-condition is configured which would prevent the acceptance of the received messages, all data messages are accepted by the inbound interface module 130, 330.

The inbound interface module then verifies 1300 if the pre-conditions include generating conditions in accordance with the graph 300 which trigger the generation of generated messages 302 to further modules. For example, the pre-conditions of A and C allow persistence of the respective data. Therefore, the inbound interface generates 1400 messages to forward the data received from the households A and C to the persistence module 150, 350. In this case the generated message 302 corresponds to the received message 301. That is, the received message is simply forwarded to the destination communication module according to the defined commination relation. There is no communication relation between the persistence module and the inbound interface for B. As a consequence, the corresponding generating condition is not fulfilled for messages associated with B. There is no communication relation between the inbound interface and the CEP module regarding data messages originating from C.

Further, because A allowed all communication relations for data messages, also data messages to be forwarded to the CEP Module 140, 340 are generated 1400 by the inbound interface. The CEP module has a communication relation with the inbound interface for household A and there is no pre-condition configured for A which would prohibit the generation of the respective message. There is no pre-condition which would prevent the CEP module from accepting the forwarded messages associated with A. The CEP module 140, 340 can analyze the accepted data messages associated with A and also generate messages according to detected events in accordance with the energy provider's request. The message generated by the CEP module corresponds to the notification message for the energy provider (data consumer 320) and can be routed to the data consumer 320 through the outbound interface module 160, 360 by applying pre-condition checks 1200, 1300 iteratively 1500 to the respective modules.

In general, messages which are generated by CEP modules or analytics modules in response to a received message are typically not identical to the received message. Rather, if allowed by the respective pre-conditions, they may include aggregate data which is based on the received data message but which aggregates this data with the data of further data messages (e.g., individual energy consumption→aggregated into a total energy consumption of a quartier). Of course, for the aggregate data message generation the respective pre-condition need to be fulfilled.

At one point in time, the CEP module detects a critical grid state (e.g., delta of total energy production and total energy consumption is close to 0) and the controller module 110 receives a corresponding notification from the CEP module. Since this case is defined as a pre-condition (pre-condition 1) of B, where B has waived his data privacy rights in favor of re-stabilizing the energy grid), the controller module 110 notifies the CEP module 140 to forward messages of household B to the outbound interface 160 (dynamically activating the corresponding communication relation). The CEP module 140 now forwards notifications which are related to messages of B to the outbound interface module 160. When the grid state data indicate a "normal" state again (that is, the delta of total energy production and total energy consumption is significantly above 0), the controller module 110 disables the previously activated communication relation between the CEP module and the outbound interface for messages associated with B. That is, the data privacy for data messages associated with B is automatically enforced again by the computer system.

Further aspects will now be described in the context of a traffic management scenario. The scenario includes three people A*, B* and C* individually traveling through a city wherein each one is driving a vehicle. Driver A* drives a conventional car, whereas driver B* drives an electric vehicle (EV). Driver C* is a truck driver. A*, B* and C* are using a GPS based navigation system that is able to send various types of information to one embodiment of the computer system 100. The information may include information about the routes of the vehicles, the driving speed and the battery level in case of the EV. Therefore, the navigation systems and/or board computers of the vehicles are data sources 210, 310 to the computer system 100.

The municipal administration of the city asks A*, B* and C* if they are willing to provide their data to the city's traffic management system for traffic optimization. Driver A* agrees. In addition to the municipal administration, the local energy provider asks driver B* if she is willing to provide information about the battery level and the location of her EV for the purpose of estimating energy demand. B* agrees with the restriction to only make use of her data if there is either a traffic jam in the city or an occurrence of an emergency situation or a critical energy grid state. In addition, B* prohibits that her data is stored permanently. C* agrees with the restriction to only make use of his data as an aggregate of data sets over all drivers. The following preconditions are configured in the controller module 100 under the control of A*, B* and C*.

A* mentioned no restrictions. Therefore no pre-condition needs to be defined his navigation system as a new data source. The controller module 100 has the configuration definition:
if data source=A* AND message type="navigation data": allow all communication relations.

B* mentioned the occurrence of traffic jams or critical grid states and she prohibits the storage of her data. Therefore the preconditions can be defined as:
1) if data source=B* AND message type="navigation data": if a traffic jam is recognized in the city, then allow all communication relations
2) if data source=B* AND message type="navigation data": on occurrence of an emergency situation allow all communication relations,
3) if data source=B* AND message type="energy data": on occurrence of a critical energy grid state allow all communication relations for energy data, and
4) if data source=B* AND message type="*": data persistence not allowed.

C* mentioned, that he only agrees to the use of his data if his data is aggregated. Therefore the precondition can be defined as:
if data source=C* AND message type="*": only allow data aggregation.

Now, the following communication relations can be created in the graph 300 by the controller module(s):
  relations between the inbound interface(s) 130, 330 and each vehicle's navigation system (data sources) 210, 310,
  relations between the inbound interface(s) 130, 330 and the persistence module(s) 150, 350 for messages originating from A* and C*.
  a relation between the CEP module(s) 140, 340 and itself (controller module) in accordance with the pre-conditions 1), 2), and 3) of B*. In addition, the controller module registers queries in the CEP module to receive notifications if the pre-condition 1), 2) or 3) of B* are fulfilled or cease to be fulfilled.

If the city traffic management system wants to make use of the data provided by A*, B* and C*, for example, the controller module can be configured to send a notification if there are traveling too many cars on a certain route. The controller module can check the pre-conditions and perform the following actions:
  It establishes the appropriate communication relations between inbound interface 130, 330 and CEP module 140, 340 for the messages of A* and B*.
  It creates relations between the CEP module 140, 340 and the outbound interface module 160, 360 for the notification messages which are also associated to the messages and pre-conditions of the navigation systems of A* and B*.
  As the query takes an aggregate of data of multiple vehicles, it also establishes the communication relations between the inbound interface and CEP module for the messages of C*'s vehicle.

The local energy provider may want to know when the EVs in the city have a low battery level to estimate near future energy demand and places of charging. For this purpose the energy provider can configure the controller module to send notifications containing the location and the battery level of the EV. The controller module can check the pre-conditions and perform the following actions:
  It establishes an additional communication relation between the CEP module 140, 340 and the outbound interface module 160, 360 for the notification messages which are also associated to the messages and preconditions of the navigation system of B*.

In operation A*, B* and C* are on the road and their navigation systems and/or board computers are sending their GPS-positions (navigation messages) to the inbound interfaces. Further, the city traffic management system sends data about the traffic status to the inbound interfaces 130, 330. Navigation messages of the drivers A* and C* are forwarded to the persistence module. Messages of driver A* are forwarded to the CEP module 140, 340 and detected events can trigger the creation of a notification message which to be forwarded to the outbound interface module 160, 360. According to the pre-conditions defined by B*, messages of driver B* are not forwarded.

Every time when the CEP module detects a traffic jam in the city (e.g., a traffic jam in front of crossroad 247) the controller module will receive a corresponding notification. Since this case is defined as a pre-condition, the controller module notifies the inbound interface to forward messages of driver B* to the CEP module (to activate the relation). The CEP module now forwards notifications which are related to messages of driver B* to the outbound interface module related to traffic management system of the city.

When a critical grid state is detected, the controller module will receive a notification. Since this case is defined as a pre-condition, the controller module notifies the inbound interface to forward messages of driver B* to the CEP module to activate the communication relation. The CEP module now forwards notifications which are related to messages of driver B* to the outbound interface module related to the energy management system of the local energy provider (data consumer).

At the moment when the incoming data signalizes no traffic jam or critical grid state any more, the controller module disables the previously activated communication relations.

At any time, if the system (in detail the CEP module) detects the occurrence of an emergency situation (e.g. a fire brigade operation needs the best route to the incident location), the controller module will receive a notification. Since this case was defined as a precondition, the controller module notifies the outbound interface to forward messages of driver B to the CEP module (to activate the relation), even if no traffic jam was detected at the same time. The CEP module now forwards notifications which are related to messages of driver B to the outbound interface module. When the incoming data indicates that the emergency occurrence does not exist any longer, the controller module disables the previously activated communication relations.

FIG. 3 illustrates a flow chart of a computer-implemented method 1000 for message routing being executed by the computer system when running a corresponding computer program product. The method 1000 is illustrated as an iterative process which describes steps performed by a first communication module. The steps are then repeated in the same manner by a second communication module and further communication modules until finally the system boundary is reached and the message is routed to an external data consumer. Thereby, the maintaining step 1050 is a kind of initialization step to define the communication relations graph which is used by later steps of the method. Maintaining 1050 is not necessarily repeated with each iteration in method 1000 but is performed whenever a need occurs for updating the graph. For example, when additional communication modules are added to the message routing system for load balancing purposes (cf. FIG. 6), the graph is maintained by the controller module and the corresponding configuration updates are made available to the communication modules (cf. FIG. 4).

A first (communication) module receives 1100 a message wherein the received message has a message type and is associated with at least one pre-condition. When the receiving step is performed for the first time the first module typically corresponds to the inbound interface which receives a message from an external data source. The message type can indicate, for example the structure of the messages, the key/value pairs or parameter types, a description of the event itself, etc. For example, energy data may have a structure different from navigation data which may result in different respective message types. A message being associated with a pre-condition means that the computer system has knowledge of earlier defined conditions which can be applicable to the received message.

The first module then checks 1200 if the at least one pre-condition includes an acceptance condition which is fulfilled by the received message. In other words, the module can determine whether any known pre-condition is configured in such a way that it applies to the received message. The information which is required for the check 1200 is maintained 1050 by the controller module in the form of the communication relations graph and the pre-conditions. In other words, the controller module holds the configuration and orchestrates the communication modules of the computer system. The controller module can continuously update the communication modules with the information which is relevant to each particular communication module for performing the message checks. The configuration of the controller module allows verifying if an external system is allowed to receive a particular message or the aggregate of multiple data sets in a message. Further, it allows verifying if a user is allowed to read, to combine and to analyze specific data sets. If the acceptance condition is not fulfilled, the first module ignores 1250 the received message and waits for the next message to be received.

If the acceptance condition is fulfilled, the received message is accepted and a further check 1300 is performed (again by using information from the controller module). The further check 1300 has the goal to validate if the message is allowed to be subject to further processing by other communication modules. Therefore, the further check is directed to a generating condition of at least one pre-condition associated with the accepted message. If the generating condition is not fulfilled the first module ignores 1350 the accepted message and waits for new messages to be received. In other words, messages that are involved in the message routing process need to fulfill a pre-condition before the message can even be generated. The pre-condition itself includes at least one event that must have occurred before the respective message can be generated.

If the generating condition is fulfilled the first module generates 1400 a generated message directed to at least a second module or an external data consumer in accordance with the graph maintained by the controller module. The second module as a target for the generated message can be identified from the graph defining the communication relations between the plurality of message communication modules. From this graph the first module can derive the target module for the generated message with the respective message type. Generating such a message may simply include the forwarding of the received message. For example, when the inbound interface receives and accepts a data message from a data source it may generate the generated message by simply forwarding the message to the target module(s) (e.g., CEP module, persistence module, analytics module, etc.). If the message generating module is a CEP module or an analytics module, a totally new message may be generated based on the data of the received message.

Once the generated message is received by the at least second module, the preceding steps can be iteratively repeated 1500 for further message communication modules in that for each iteration the at least second module is treated as the first module and at least a further module is treated as the at least second module in accordance with the graph. This iteration continuous until a last module (typically an outbound interface module) of the computer system is reached wherein the last module has a communication relation with the external data consumer. In other words, if the second module corresponds to the CEP module, the CEP module performs the checking steps 1200, 1300 with regards to message generated by the first module and now becoming the received message for the CEP module. The CEP module can then generate a new message if the (by the CEP module) received and accepted message passes the further check 1300. In compliance with the communication relations graph the generated message is then sent to a further communication module (e.g., the CEP module itself or the outbound interface module) which is then performing the role of the first module and treating the generated message again as a received message. A person skilled in the art can apply the iteration to any message communication module for any message type within the computer system for message routing.

Figure 4:
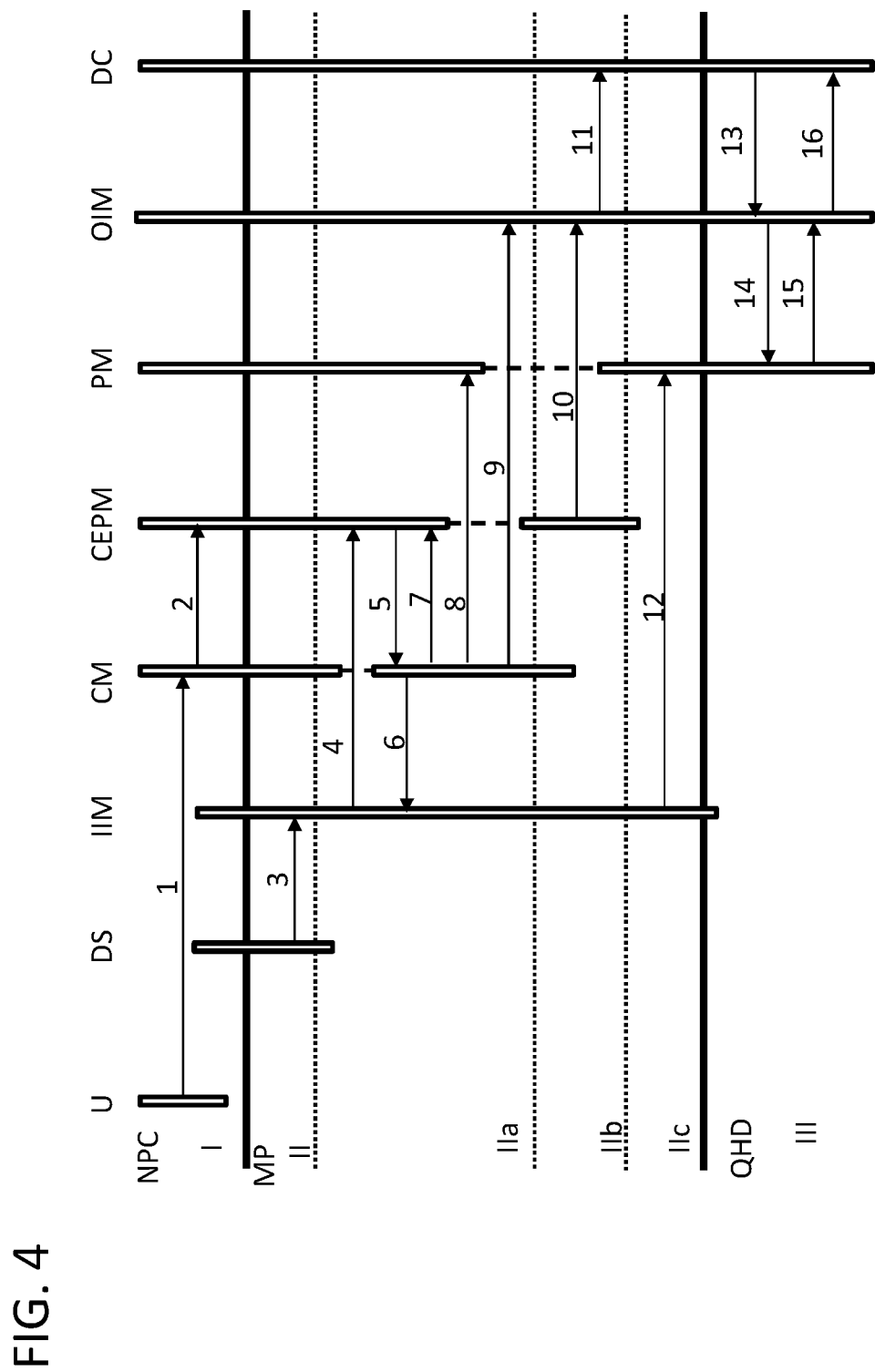
FIG. 4 is a swim line diagram illustrating message flow between communication modules according to specific example embodiments.

FIG. 4 is a swim line diagram illustrating message flow between communication modules according to specific example embodiments. The vertical bars in FIG. 4 represent the following entities: U: user; DS: data source; IIM: inbound interface module; CM: controller module; CEPM: CEP module; PM: persistence module; OIM: outbound interface module; and DC: data consumer. Arrows between the entities represent messages being sent from one entity to another entity. For better readability entity bars are interrupted (by dashed lines) when message arrows go across the respective entity. In the vertical dimension the swim line diagram is divided into different areas. The area I (NPC) relates to messages in the context of creating new pre-conditions. Area II (MP) relates to message processing where sub-area IIa relates to pre-condition detection and sub-area IIb relates to event detection in cases where a communication relation to a CEP module exists for real time processing. Sub-area IIc relates to message processing where a communication relation to a persistence module exists for storing data/messages. Area QHD III relates to the querying of historic data.

Area I illustrates that a user U is sending message 1 to the controller module. Message 1 includes the information defining a pre-condition for a particular message type for the user. That is, the user determines by this configuration how data which will be generated by the user's data source DS will be handled by the various communication modules. The configured pre-conditions allow the user to keep control of the data provided by the data source and decide about the later potential use of the data by other parties (data consumers). In response to the received message 1, CM sends message 2 to the CEPM. Message 2 causes the CEPM to register queries for the received pre-conditions so that the CEPM can notify CM once a registered pre-condition is fulfilled by received data/events.

Area II illustrates that the DS associated with the user U sends message 3 which is received by the IIM. In the following it is assumed that both, the acceptance and the generating conditions of the registered pre-conditions are fulfilled by the received messages. In the example, the IIM generates message 4 (which can be identical to message 3) and forwards message 4 to the CEPM as an event. If the CEPM detects a pre-condition associated with the received event (message 4) it sends notification message 5 back to the CM. The CM informs the other communication modules about the new detected pre-condition by generating corresponding configuration updated messages 6, 7, 8, 9 and sending them to the respective communication modules IIM, CEPM, PM, OIM. This enables the various communication modules to take real time accepting/generating decisions for messages based on the current configuration of the communication relations graph.

If a registered event is detected, the CEPM generates notification message 10 which is sent to the OIM from where it is forwarded (message 11) to the respective DC. If a communication relation exists between the IIM and PM, message 12 is forwarded to the PM.

In area III it is assumed that a DC sends query message 13 which includes a request for historic data stored in the PM. The OIM receives the message 13 and forwards the corresponding generated message 14 to the PM. The PM retrieves the requested data and sends response message 15 to the OIM from where generated message 16 is forwarded to the requesting DC thus satisfying the DC information request.

Figure 5:
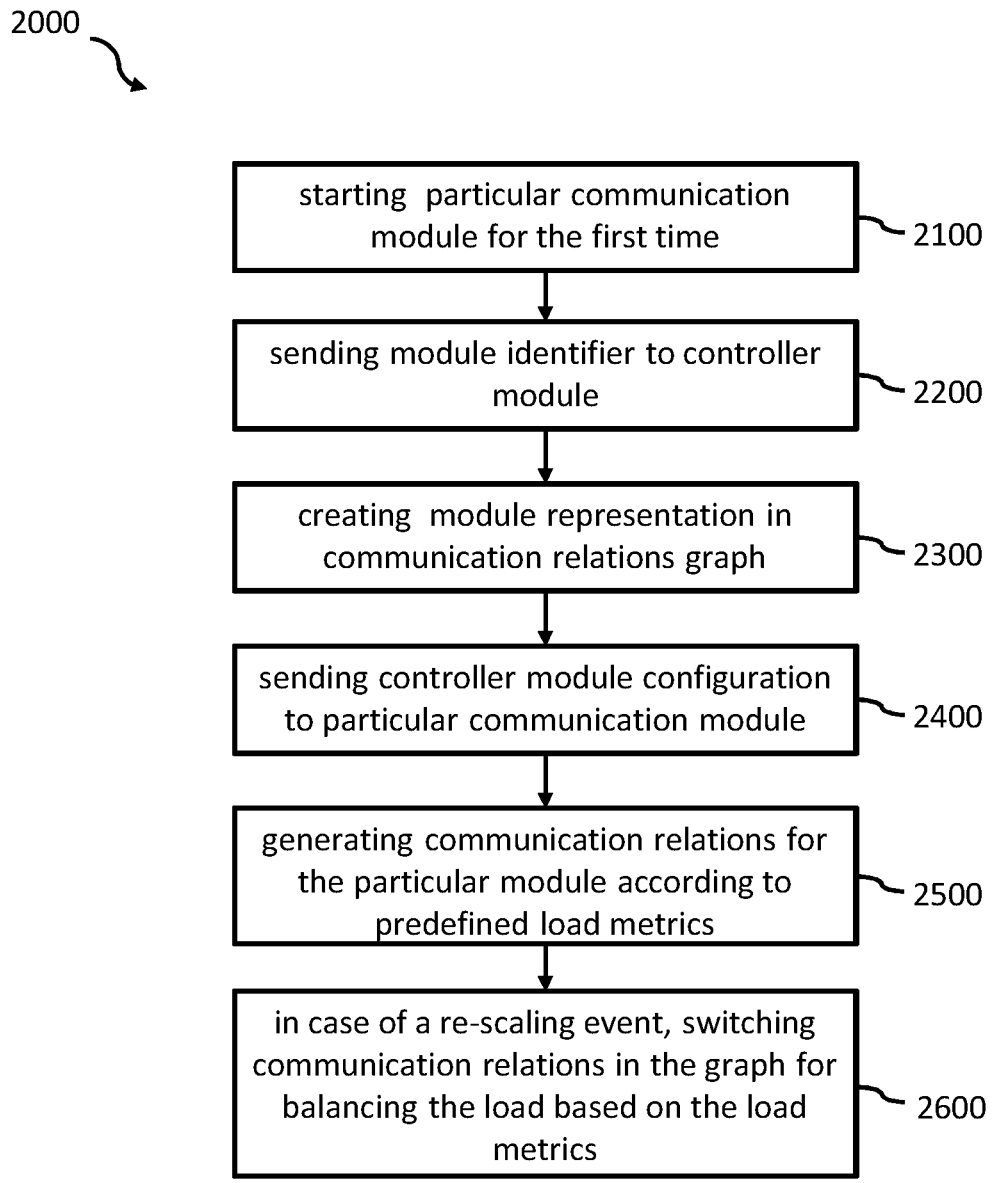
FIG. 5 is a simplified flow chart of a method which enables load balancing in one embodiment of the computer system and improves scalability of the message routing system.

FIG. 5 is a simplified flow chart of a method 2000 which enables load balancing in one embodiment of the computer system 100 (cf. FIG. 1) and improves scalability of the message routing system. Method 2000 can run before step 1100 of method 1000 (cf. FIG. 3) or it can run after step 1400. When a particular one of the communication modules (e.g., inbound interface, outbound interface, persistence, CEP, analytics) is started 2100 for the very first time it can send 2200 an identifier token/object to the controller module (e.g., via a broadcast message). In response, the controller module creates 2300 a new entity in the communication relations graph which represents the particular communication module and sends 2400 configuration information, such as for example, the URI of the responsible controller module, credentials, etc., back to the particular communication module.

Figure 6:
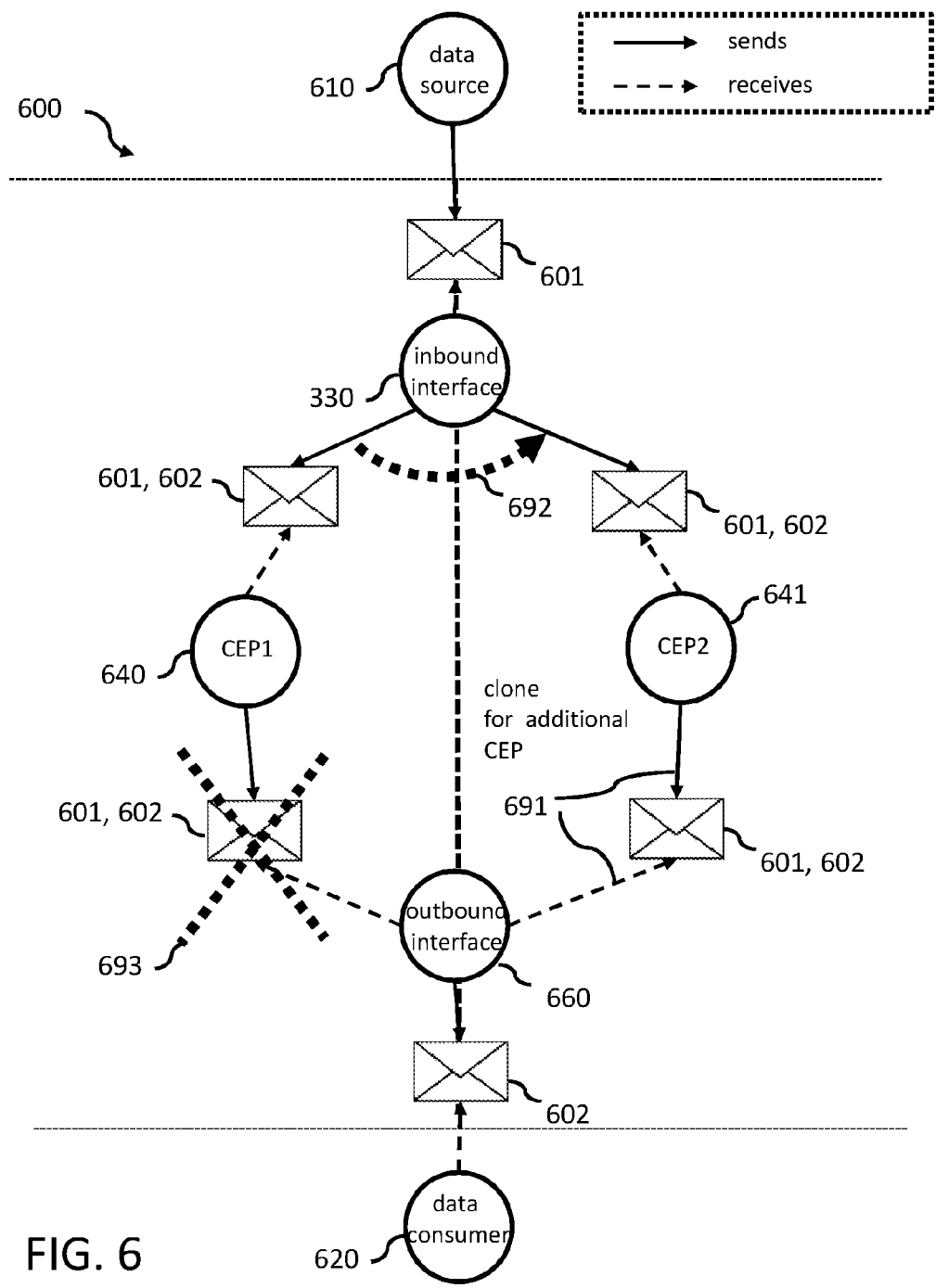
FIG. 6 illustrates an example of a simplified communication relations graph used for load balancing in a message routing system according to an example embodiment.

FIG. 6 illustrates, by way of example, a simplified communication relations graph 600 (without pre-conditions) where a first CEP module CEP1 was already present in the message routing system and has representation 640 with communication relations to the inbound interface 330 and outbound interface 660 modules. A second CEP module CEP2 was started by the message routing system and has sent its identifier to the controller module. In response, the controller module created representation 641 and cloned the communication relations of CEP1. FIG. 6 also illustrates graph representations of data source 610 (providing message 601) and data consumer 620 (receiving message 602).

Since the CEP modules 640, 641 (in general any modules of the same kind) are functionally equivalent, the controller module(s) can define the communication relations and thus the physical message exchange between the communication modules based on several metrics aiming to choose an appropriate number of modules of the same kind for an optimized scaling of the message routing system.

Back to FIG. 5, the controller may choose one or more of the following load metrics to start the deployment process of a newly added particular communication module by generating 2500 the respective communication relations for the particular module:

the number of communication relations of one or more modules of the same kind,
the frequency of sent or received messages,
the physical resources (CPU, memory, etc. usage) of a module,
the response time of a module,
the latency between different modules (e.g., when running on different machines),
failure of a module In case of a re-scaling event (e.g., an up-scale or a down-scale event) occurring at runtime, the corresponding communication relations can be switched 2600. That is, the relations in the communication relations graph and the physical message exchange can be distributed or reunited to the available modules. The following steps provide an example for this process:

Turning back to FIG. 6, a second CEP module CEP2 is deployed or started in the message routing system. The controller module creates the respective entity (representation 641) in the graph 600. For example, the above load metrics may indicate that the CEP module CEP1 is running a risk to become a bottleneck for the message routing system and deploy the second CEP module CEP2.

If required, the existing communication relations of the first CEP module CEP1 can be switched to the second one CEP2. This may include:

The affected outbound relations are cloned 691. The cloning of the affected outbound relations ensures that no messages can be lost and that always at least one end-to-end communication path is available in the message routing system.

The affected inbound relations are switched 692.

The affected outbound relations of the already previously existing CEP1 are removed 693.

In other words, the relation CEP1→outbound interface is duplicated (i.e. a second relation is created). The relation inbound interface→CEP1 is switched to inbound interface CEP2 and the relation CEP1→outbound interface is deleted.

The message routing system can now distribute the message load to both CEP modules CEP1, CEP 2 by taking into account the above load metrics to better balance the message load of the various communication modules.

In case the message load is going down again the controller module may decide, based on the load metrics, to remove an already running CEP module for saving resources (e.g., computing, energy). For this purpose, existing communication relations of, for example, CEP2 can be switched back to the CEP1 module. This may include:

The affected outbound relations are cloned.
The affected inbound relations are switched back to CEP1.
The affected outbound and inbound relations of the affected CEP2 will be removed.

Then, the CEP2 module can be undeployed or shut down.

Figure 7:
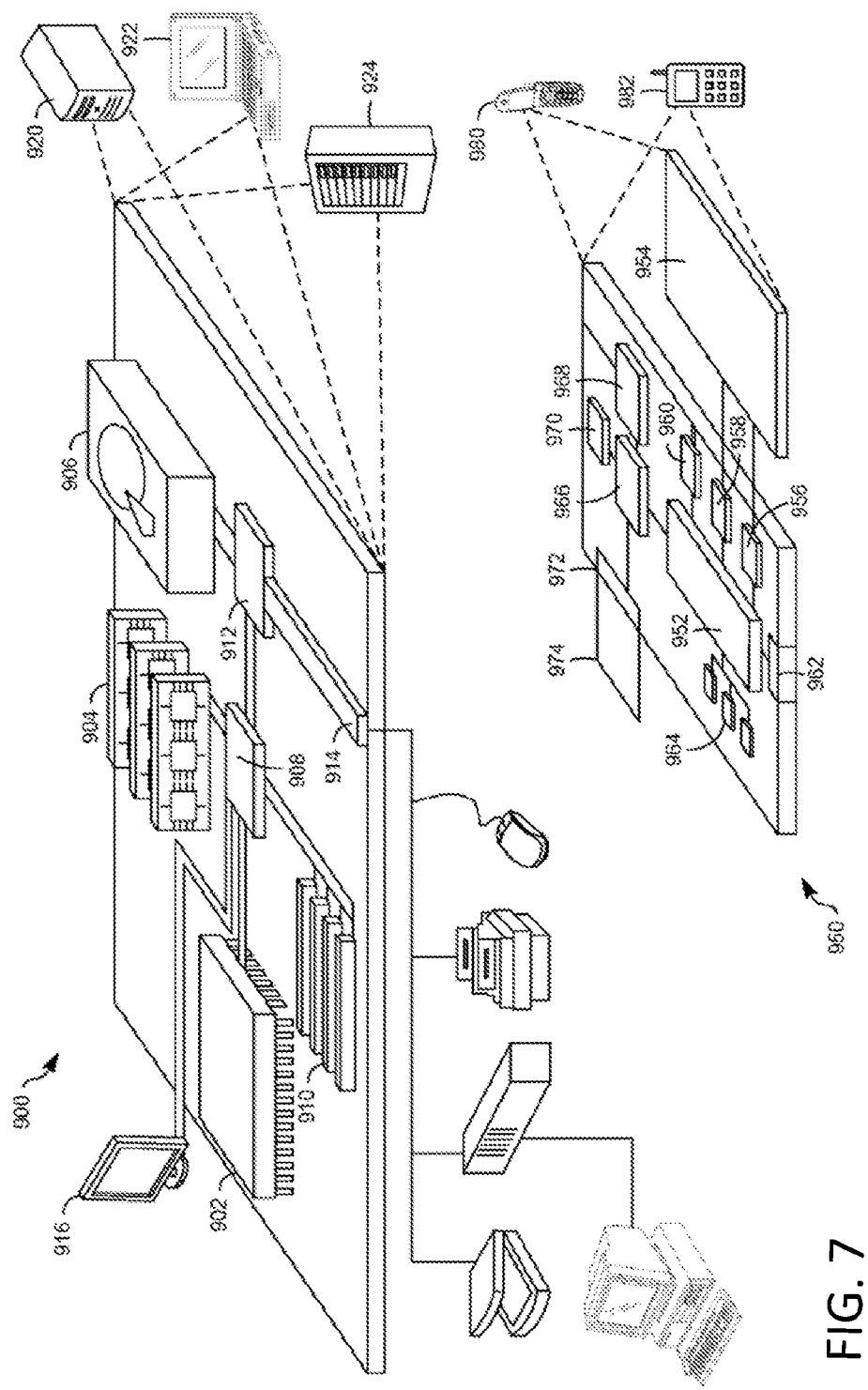
FIG. 7 is a diagram that shows an example of a computer device and a mobile computer device, which may be used with the techniques described here.

FIG. 7 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may include the data sources or data consumers as shown in FIG. 1. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer system for message routing, comprising:
   at least one controller module configured to maintain a graph, the graph defining communication relations between a plurality of message communication modules for providing data associated with a service provider, the communication relations defining that a pre-condition check occurs for each message to be exchanged between any one of the modules of the system wherein pre-conditions are associated with one or more events which relate to an information request received from the service provider and define under which conditions in which data can be used and at which aggregation level the data can be used, each communication relation defining a particular message type for a particular pair of message communication modules out of the plurality of message communication modules, the at least one controller module further configured to use the graph to maintain data privacy according to the pre-conditions when messages are to be exchanged between any one of the modules of the system;
   the plurality of message communication modules comprising:
   a first communication module configured:
      to receive a message wherein the received message has a message type and is associated with at least one pre-condition, and, upon verification of an acceptance condition of the at least one pre-condition in accordance with the graph, further configured to accept the received message if the acceptance condition is fulfilled; and upon verification of a generating condition of the at least one pre-condition in accordance with the graph, to generate a generated message, directed to at least one second communication module or to an external data consumer in accordance with the graph if the generating condition is fulfilled, wherein the service provider is a utility service provider or a traffic management system.

2. The computer system according to claim 1, wherein the pairs of message communication modules having a communication relation are selected from:
the first communication module being an inbound interface module and the second communication module being a complex event processing module, a persistence module, or an analytics module;
the second communication module being an outbound interface module and the first communication module being a complex event processing module, a persistence module, or an analytics module; and
the first communication module being a complex event processing module or an analytics module and the second communication module being a complex event processing module or an analytics module.

3. The computer system of claim 1, wherein at least one message communication module is configured to receive a message from an external data source, at least one message communication module is configured to process the received message by using complex event processing, at least one message communication module is configured to persist the received message, and at least one message communication module is configured to forward the generated message to the external data consumer.

4. The computer system of claim 1, wherein the at least one controller module is further configured:
to register one or more queries with at least one of the message communication modules for detecting a particular event associated with a particular pre-condition, the particular pre-condition being associated with a particular pair of message communication modules,
to receive a notification from the at least one of the message communication modules when the particular event is detected,
to activate a particular communication relation between the particular pair of message communication modules when the particular pre-condition is fulfilled,
wherein each particular pre-condition is configured to be modified according to the status.

5. The computer system of claim 4, wherein the at least one controller module is further configured:
to deactivate the particular communication relation between the particular pair of message communication modules when the particular pre-condition ceases to be fulfilled.

6. The computer system of any one of claim 1, wherein the first communication module and the second communication module are the same communication module.

7. The computer system of claim 1, wherein the at least one controller module is further configured:
to receive a module identifier from a message communication module being started for the first time;
to create a module representation for the first time started message communication module in the graph;
to send controller module configuration data to the first time started message communication module;
to generate communication relations for the first time started message communication module according to predefined load metrics; and
to switch communication relations in the graph from a previously existing message communication module to the first time started message communication module for balancing the load based on the load metrics in case of a re-scaling event.

8. The computer system of claim 7, wherein the predefined load metrics are selected from any one of the group consisting of: a number of communication relations of one or more message communication modules of the same kind, a frequency of sent or received messages, physical resources of a message communication module, a response time of a message communication module, latency between different message communication modules, and a failure of a message communication module.

9. The computer system of claim 7, wherein the configuration to switch communication relations comprises:
to clone affected outbound interface communication relations of the previously existing message communication module for the first time started message communication module;
to switch affected inbound interface communication relations from the previously existing message communication module for the first time started message communication module; and
to remove affected outbound interface communication relations of the previously existing message communication module.

10. A computer-implemented method for message routing in a computer system with a plurality of message communication modules, comprising:
maintaining, by a controller module, a graph defining communication relations between the plurality of modules for providing data associated with a service provider, the communication relations defining that a pre-condition check occurs for each message to be exchanged between any one of the modules of the system wherein pre-conditions are associated with one or more events which relate to an information request received from the service provider and define under which conditions in which data can be used and at which aggregation level the data can be used, each communication relation defining a particular message type for a particular pair of message communication modules out of the plurality of message communication modules, the controller module further configured to use the graph to maintain data privacy according to the pre-conditions;
receiving, by a first communication module, a message wherein the received message has a message type and is associated with at least one pre-condition;
checking, in accordance with the graph, if the at least one pre-condition includes an acceptance condition which is fulfilled;
if the acceptance condition is not fulfilled, ignoring the received message;
if the acceptance condition is fulfilled, checking, in accordance with the graph, if the at least one pre-condition includes a generating condition which is fulfilled;
if the generating condition is not fulfilled, ignoring, by the first communication module, the message;
if the generating condition is fulfilled, generating, by the first communication module, a generated message, directed to at least a second communication module or an external data consumer in accordance with the graph; and
iteratively repeating the preceding steps starting with the receiving step for further communication modules in that for each iteration the at least one second communication module is treated as the first communication module and at least a further communication module is treated as the at least one second communication module in accordance with the graph until a last communication module of the computer system is reached wherein the last communication module has a communication relation with the external data consumer, wherein the service provider is a utility service provider or a traffic management system.

11. The method of claim 10, wherein the pairs of modules having a communication relation are selected from:
the first communication module being an inbound interface module and the second communication module being a complex event processing module, a persistence module, or an analytics module;
the second communication module being an outbound interface module and the first communication module being a complex event processing module, a persistence module, or an analytics module; and
the first communication module being a complex event processing module or an analytics module and the second communication module being a complex event processing module or an analytics module.

12. The method of claim 10, wherein at least one message communication module is configured to receive a message from an external data source, at least one communication module is configured to process the received message by using complex event processing, at least one message communication module is configured to persist the received message, and at least one message communication module is configured to forward the generated message to the external data consumer.

13. The method of claim 10, further comprising the following steps executed by the controller module:
registering one or more queries with at least one of the message communication modules for detecting a particular event associated with a particular pre-condition, the particular pre-condition being associated with a particular pair of message communication modules;
receiving a notification from the at least one of the message communication modules when the particular event is detected; and
activating a particular communication relation between the particular pair of message communication modules when the particular pre-condition is fulfilled,
wherein each particular pre-condition is associated with one or more events which relate to an information request received from a service provider that generated each particular message.

14. The method of claim 10, further comprising the following steps executed by the controller module:
receiving a module identifier from a message communication module being started for the first time;
creating a module representation for the first time started message communication module in the communication relations graph;
sending controller module configuration data to the first time started message communication module;
generating communication relations for the first time started message communication module according to predefined load metrics; and
switching communication relations in the graph from a previously existing message communication module to the first time started message communication module for balancing the load based on the load metrics in case of a re-scaling event.

15. A non-transitory computer program product including a set of instructions that when loaded into a memory of a computing device and executed by at least one processor of the computing device causes the computing device to execute the steps of:
maintaining, by a controller module, a graph defining communication relations between a plurality of message communication modules for providing data associated with a service provider, the communication relations defining that a pre-condition check occurs for each message to be exchanged between any one of the plurality of message communication modules, wherein pre-conditions are associated with one or more events which relate to an information request received from the service provider and define under which conditions in which data can be used and at which aggregation level the data can be used, each communication relation defining a particular message type for a particular pair of message communication modules out of the plurality of message communication modules, the controller module configured to use the graph to maintain data privacy according to the pre-conditions;
receiving, by a first communication module, a message wherein the received message has a message type and is associated with at least one pre-condition;
checking, in accordance with the graph, if the at least one pre-condition includes an acceptance condition which is fulfilled;
if the acceptance condition is not fulfilled, ignoring the received message;
if the acceptance condition is fulfilled, checking, in accordance with the graph, if the at least one pre-condition includes a generating condition which is fulfilled;
if the generating condition is not fulfilled, ignoring, by the first communication module, the message;
if the generating condition is fulfilled, generating, by the first communication module, a generated message, directed to at least a second communication module or an external data consumer in accordance with the graph; and
iteratively repeating the preceding steps starting with the receiving step for further communication modules in that for each iteration the at least one second communication module is treated as the first communication module and at least a further communication module is treated as the at least one second communication module in accordance with the graph until a last communication module is reached wherein the last communication module has a communication relation with the external data consumer, wherein the service provider is a utility service provider or a traffic management system.

16. The non-transitory computer program product of claim 15, wherein the pairs of message communication modules having a communication relation are selected from:
the first communication module being an inbound interface module and the second communication module being a complex event processing module, a persistence module, or an analytics module;
the second communication module being an outbound interface module and the first communication module being a complex event processing module, a persistence module, or an analytics module; and
the first communication module being a complex event processing module or an analytics module and the second communication module being a complex event processing module or an analytics module.

17. The non-transitory computer program product of claim 15, wherein at least one message communication module is configured to receive a message from an external data source, at least one message communication module is configured to process the received message by using complex event processing, at least one message communication module is configured to persist the received message, and at least one message communication module is configured to forward the generated message to the external data consumer.

18. The non-transitory computer program product of claim 15, comprising further instructions including:
registering one or more queries with at least one of the message communication modules for detecting a particular event associated with a particular pre-condition, the particular pre-condition being associated with a particular pair of message communication modules;
receiving a notification from the at least one of the message communication modules when the particular event is detected;
activating a particular communication relation between the particular pair of message communication modules when the particular pre-condition is fulfilled,
wherein each particular pre-condition is associated with one or more events which relate to an information request received from a service provider that generated each particular message.

19. The non-transitory computer program product of claim 15, comprising further instructions including:
receiving a module identifier from a message communication module being started for the first time;
creating a module representation for the first time started message communication module in the communication relations graph;
sending controller module configuration data to the first time started message communication module;
generating communication relations for the first time started message communication module according to predefined load metrics; and
switching communication relations in the graph from a previously existing message communication module to the first time started message communication module for balancing the load based on the load metrics in case of a re-scaling event.

20. The computer system according to claim 1, wherein, upon receipt of the generated message, the at least one second communication module is configured to implement function of the first communication module and at least a further module is treated like the original at least one second communication module in accordance with the graph.

* * * * *

UNITED STATES PATENT AND TRADEMARK OFFICE
CERTIFICATE OF CORRECTION

PATENT NO. : 10,270,647 B2
APPLICATION NO. : 15/130599
DATED : April 23, 2019
INVENTOR(S) : Mueller et al.

It is certified that error appears in the above-identified patent and that said Letters Patent is hereby corrected as shown below:

In the Claims

In Column 21, Line 54, Claim 6, Line 1, delete "any one of claim 1," and insert -- claim 1, --, therefor.

Signed and Sealed this
Tenth Day of September, 2019

Andrei Iancu
*Director of the United States Patent and Trademark Office*